VINYLIDENE CHLORIDE COPOLYMER COMPOSITION

BACKGROUND OF THE INVENTION

1. Field of the Invention

The present invention relates to a vinylidene chloride copolymer composition, more particularly, it relates to a vinylidene chloride copolymer composition which is produced by copolymerizing vinylidene chloride monomer and a comonomer under dissolving a rigid polymer in the vinylidene chloride monomer and which has excellent extrusion processability, and has the improved surface condition of the molded product.

2. Field of the Invention

It has been known that vinylidene chloride copolymer compositions comprising vinylidene chloride copolymer produced by copolymerizing 60 to 95 wt. parts of vinylidene chloride and 40 to 5 wt. parts of a comonomer (total 100 wt. parts) and 5 to 15 wt. parts of a modifier e.g. a plasticizer and a stabilizer, if necessary, 1 to 20 wt. parts of a modifier e.g. a rubber-like elastomer, are used for the extrusion molding to obtain molded products such as film, bottle etc. by blending, melting and extruding the composition by a screw type melt extruder.

The molded products have excellent tensile strength, flexibility and transparency and excellent gas barrier characteristic whereby they have been widely used as packages for food and others.

However, they have been used for various usages. In the packages for retort food, dry food and rottable food, the gas barrier characteristics of the molded products have not been satisfactory. In order to adapt the products to have high gas barrier characteristic, and to treat at high speed in the automatic packaging, printing and laminating machines, the compositions having superior physical characteristics have been required. Various methods have been proposed to satisfy the demands. However, the known compositions have certain disadvantage and the composition having both of excellent gas barrier characteristic and physical characteristics has not been known.

The gas barrier characteristic can be improved by decreasing the amounts of plasticizer and other additives. However, it has been known that the copolymers having more than 60 wt.% of vinylidene chloride component have each melting point which is near the decomposing temperature and when the content of the plasticizer is decreased to be substantially the component of the copolymer, the copolymer is easily thermally decomposed in the extrusion molding operation.

In order to improve the physical characteristics, a powdery additive such as an inorganic material e.g. metal oxides and hydroxides and an organic material e.g. polymers having high melting point is incorporated to form rough surface of the molded product or a lubricant having a melting point of higher than the room temperature such as higher fatty acids, modified higher fatty acids, paraffin and waxes or a crystalline material is incorporated to migrate it on the surface of the molded product or to impart the smoothness of the surface of the product.

When the powdery material is incorporated, there is the possibility to disadvantageously form pin-holes on the film product. When the lubricant or the crystalline material is incorporated, the additive causes adverse effect in the printing and laminating operation. When the film product is used for wrapping food, the additive is easily migrated to be disadvantageous from the viewpoint of hygiene, moreover, the extrusion processability is not stable and the extruding rate is decreased because of slippage in the extruder. Accordingly, the amount of the additive has been limited to be small and the physical characteristics have not been satisfactory by the addition of a single additive. In many cases, both of the powder and the lubricant or the crystalline materials have been incorporated to impart the balance of the improved physical characteristics and the deterioration of the other characteristics.

SUMMARY OF THE INVENTION

It is an object of the present invention to provide a vinylidene chloride copolymer composition having the improved characteristics especially excellent processability and excellent physical characteristics having improved surface condition.

It is the other object of the present invention to provide a vinylidene chloride copolymer composition which has excellent gas barrier characteristic and excellent physical characteristics and which is suitable for packages.

The foregoing and other objects of the present invention have been attained by providing a vinylidene chloride copolymer composition which is produced by copolymerizing 60 to 95 wt.% of vinylidene chloride and 40 to 5 wt.% of a comonomer in the presence of a rigid polymer which has a softening temperature of 50° to 180° C. and a melt viscosity of 0.1 to 500 poise at 170° C. and is soluble in vinylidene chloride monomer and is not substantially miscible to the vinylidene chloride copolymer, at a ratio of 0.01 to 5 wt. parts per 100 wt. parts of the monomer mixture.

DETAILED DESCRIPTION OF THE PREFERRABLE EMBODIMENTS

The present invention is to provide a vinylidene chloride copolymer composition having the improved characteristics especially excellent processability and excellent physical characteristics having improved surface condition which is produced by copolymerizing vinylidene chloride and a small amount of a comonomer in the presence of the rigid polymer which has low melt viscosity at high temperature to flow at the processing of vinylidene chloride copolymer and which is a rigid polymer at room temperature and which is soluble in vinylidene chloride monomer but is not substantially miscible to the vinylidene chloride copolymer (hereinafter referring to as the rigid polymer) under dissolving the rigid polymer into the monomer mixture.

The rigid polymer dissolved in the vinylidene chloride monomer mixture is solidified in the form of microdispersion in the copolymer depending upon the consumption of the monomer mixture under the copolymerization. At the time of the extrusion molding operation at high temperature, the rigid polymer has lower melt viscosity than that of the matrix of the vinylidene chloride copolymer whereby the melt viscosity of the copolymer composition is lowered to reduce the heat caused by friction and to remarkably improve the processability in the extrusion molding operation.

When the molded product is quenched just after extrusion and the resulting non-crystalline product is stretched to crystallize, the rigid polymer is dispersed in the soft non-crystalline matrix as the rigid solid particles, and the non-uniform strain is caused by the stretch

United States Patent [19]

Hisazumi et al.

[11] 4,143,011

[45] Mar. 6, 1979

[54] VINYLIDENE CHLORIDE COPOLYMER COMPOSITION

[75] Inventors: Nobuyuki Hisazumi; Tsutomu Uehara, both of Iwaki, Japan

[73] Assignee: Kureha Kagaku Kogyo Kabushiki Kaisha, Tokyo, Japan

[21] Appl. No.: 847,929

[22] Filed: Nov. 2, 1977

[30] Foreign Application Priority Data

Nov. 19, 1976 [JP] Japan .................................. 51-139088

[51] Int. Cl.² .............................................. C08L 27/08
[52] U.S. Cl. ............................ 260/23 EP; 260/22 CB; 260/23 XA; 260/30.4 R; 260/31.6; 260/31.8 M; 260/857 G; 260/857 UN; 260/869; 260/873; 260/878 R; 260/879; 260/881; 260/884; 260/899; 260/898; 260/897 C; 260/DIG. 32
[58] Field of Search ................ 260/884, 899, DIG. 32, 260/22 CB, 22 EP, 857 G, 857 UN, 869, 873, 881, 898

[56] References Cited

U.S. PATENT DOCUMENTS

| 3,234,313 | 2/1966 | Miller et al. | 264/230 |
| 3,723,571 | 3/1973 | Haskell | 260/836 |
| 3,963,790 | 6/1976 | Couchoud | 260/898 |

*Primary Examiner*—Carman J. Seccuro
*Attorney, Agent, or Firm*—Oblon, Fisher, Spivak, McClelland & Maier

[57] ABSTRACT

A vinylidene chloride copolymer composition is produced by copolymerizing 60 to 95 wt. % of vinylidene chloride and 40 to 5 wt. % of a comonomer in the presence of a rigid polymer which has a softening temperature of 50 to 180° C. and a melt viscosity of 0.1 to 500 poise at 170° C. and is soluble in vinylidene chloride monomer and is not substantially miscible to the vinylidene chloride copolymer, at a ratio of 0.01 to 5 wt. parts per 100 wt. parts of the monomer mixture.

9 Claims, No Drawings mer mixture is in a range of 0.5 to 3 wt. parts of water per 1 wt. part of the monomer mixture.

Suitable dispersing agents include water soluble high molecular weight dispersing agents such as methyl cellulose, ethyl cellulose, polyvinyl alcohols.

Suitable catalysts include azobisisobutyl nitrile, benzoyl peroxide, lauryl peroxide, di-n-propyl peroxydicarbonate, di-isopropyl peroxydicarbonate, di-(2-chloroethyl) peroxydicarbonate, and oil soluble radical catalysts used for the copolymerization of vinylidene chloride.

It is possible to add the other additives such as a polymerization regulator, a pH adjusting agent, a stabilizer, a plasticizer etc. if necessary.

The polymerization temperature is in a range of 25° C. to 70° C.

The vinylidene chloride copolymer composition obtained by the present invention can be molded with or without a small amount of a plasticizer, a stabilizer or the other additive, It is possible to add an elastomer so as to improve the impact strength.

It is also possible to blend the additive such as the plasticizer, the stabilizer and the elastomer to the monomer mixture together with the rigid polymer. The vinylidene chloride copolymer compositions produced by copolymerizing the monomer mixture containing the rigid polymer and the other additives can be the compositions of the present invention.

Suitable plasticizers and stabilizers include aliphatic dibasic acid esters such as dioctyl adipate, dioctyl sebacate and dibutyl sebacate; hydroxypolycarboxylic acid esters such as tributyl citrate and tricutyl acetylcitrate; glycerol esters; polyester type plasticizers, epoxidized vegetable oil, epoxystearic acid octyl ester, isopropylidene diphenolepichlorohydrine condensate etc..

The plasticizer or stabilizer can be used for improving the processability of the copolymer composition wherein the rigid polymer is dispersed in vinylidene chloride copolymer. The amount of the plasticizer and stabilizer can be remarkably lower than the amount of them in the conventional vinylidene chloride copolymer composition.

The elastomers can be elastomers being compatible with the vinylidene chloride copolymer such as ethylene-vinyl acetate copolymer, ethylene-acrylic acid copolymer and polymers or copolymers of styrene, butadiene alkyl acrylate or alkyl methacrylate.

The elastomer is used for improving impact strength at low temperature, heat seal property etc..

When the amount of the elastomer is less than 1 wt.%, the effect of the elastomer may not be found. When the amount of the elastomer is more than 20 wt.%, the strength of the film is lowered and it is not suitable for the industrial purpose.

The vinylidene chloride copolymer compositions of the present invention can be used not only for molding the composition itself but also for preparing package products having excellent characteristics for suitable purposes by the coextrusion method or the lamination method to form laminated layers under using various other resins with the copolymer composition.

The other resins used for these purposes can be various resins. Suitable resins include homopolymers and copolymers of ethylene and propylene and copolymers of ethylene or propylene with vinyl acetate, vinyl alcohol, acrylic acid, acrylic acid ester, methacrylic acid, methacrylic acid ester, vinyl chloride, alkyl vinyl ether, maleic anhydride or etaconic acid; modified copolymers containing metal atoms; polyesters, nylon; acrylonitrile type polymers; polyvinyl alcohol; vinylidene chloride polymers; polyvinyl chloride; polystyrene; polycarbonate; cellulose film and paper, it can be a metal layer.

The invention will be further illustrated by certain examples wherein the effects of the invention will be clearly understood.

The rigid polymers used in the examples were respectively dissolved at a ratio of more than 5 g per 100 g of vinylidene chloride monomer at room temperature. When 1 wt.% of the rigid polymer was blended to the copolymer produced by using 80 wt.% of vinylidene chloride and 20 wt.% of vinyl chloride(Example 1-A) and the mixture was kneaded in molten condition and was quenched to form a sheet and the sheet was biaxially stretched to about 3 times at the room temperature to obtain a film having a thickness of about 50 $\mu$, the white mar caused by the phase separation was clearly found. The tests were visually carried out by adding 1 wt.% of the rigid polymer. When the test is carried out with a microscope, the phase separation can be measured by using a smaller amount such as 0.01 wt.% of the rigid polymer.

EXAMPLE 1

In order to find the effects of the melt extrusion processability, the slippage of the film and the gas barrier characteristic by additions of the rigid polymer, vinylidene chloride monomer, vinyl chloride monomer, the catalyst, the dispersing agent, the pH adjusting agent and the epoxidized linseed oil at the ratios shown in Table 1, were charged into a 2 m$^3$ autoclave and the mixture was stirred and copolymerized under the condition shown in Table 1 to obtain the vinylidene chloride-vinyl chloride copolymer as the basic copolymer composition (A).

The styrene-isobutylene copolymer (70 wt.% of styrene component) having a softening temperature of 85° to 96° C. and a melt viscosity of 7 to 15 poise at 170° C. (hereinafter referring to as PST-IB) was dissolved in vinylidene chloride monomer at a ratio of 2 wt. parts per 100 wt. parts of vinylidene chloride monomer (1.6 wt. parts per 100 wt. parts of the monomer mixture) to uniformly mix it.

Table 1

|  |  | wt. parts |
|---|---|---|
| Vinylidene chloride monomer | 80 | Total 100 |
| Vinyl chloride monomer | 20 | |
| Water | 150 | |
| Methyl cellulose | 1.0 | |
| Lauryl peroxide | 0.3 | |
| Sodium pyrophosphate | 2.0 | |
| Epoxidized linseed oil | 1.0 | |
| Condition of Polymerization: | | |
| Stirring speed: Dispersing | 300 rpm | |
| Polymerization | 100 rpm | |
| Temperature: | 40° C. | |

In accordance with the process for preparing the copolymer composition (A) except using the resulting solution instead of the vinylidene chloride monomer, the copolymerization was carried out by using the same vinyl chloride, catalyst, dispersing agent, pH adjusting agent and epoxidized linseed oil under the same condition, to obtain the vinylidene-vinyl chloride copolymer composition (B).

As the references, 2 wt. parts or 3 wt. parts of dioctyl adipate (hereinafter referring to as DOA) as the conventional plasticizer, was added to 100 wt. parts of the copolymer composition (A) to obtain the copolymer compositions (C) and (D).

0.1 Wt. part of calcium carbonate and 0.05 wt. part os stearic acid amide were added to 100 wt. parts of the copolymer composition (D) to obtain the copolymer composition (E).

3 Wt. parts of DOA was added to 100 wt. parts of the copolymer composition (B) to obtain the copolymer composition (F).

The copolymer compositions (A) to (F) were respectively extruded by using a screw type extruder (diameter of 90 mm; L/D = 18) equipped with a circular die at the top, at 170° C. The extruded tube having a thickness of 300μ was quenched in water at 10° C. and was stretched by the inflation method under feeding air, to obtain the film having a thickness of 25μ which was stretched to 3 times in longitudinal direction and to 4 times in transversal direction.

The melt viscosity at 170° C. was measured by using the Taka type flow tester as the degree of extrusion processability of the copolymer composition. The extrusion processability and the fabricatability of film were rated as follows.

Bad: The severe thermal decomposition or phase separation was caused within 30 minutes. Industrial production was difficult.

Fair: The decomposed material was flowed though the fabrication can continue for about 1 hour.

Good: The fabrication can continue longer than 4 hours in best condition.

The surface slippage of the film obtained by the inflation method was measured by ASTM-D-1894 as coefficient of friction.

The gas barrier characteristic was measured as permeability of oxygen by using a tester (Oxy-tran 100 type manufactured by Modern Control Co.). The results are shown in Table 2.

sition (B), however, the permeability of oxygen was increased. When the inorganic filler of $CaCO_3$ and the organic lubricant of stearic acid amide were added, the slippage was improved under high permeability of oxygen.

In the case of composition (A), the thermal decomposition was severe in the melt extrusion because of high melt viscosity, and suitable film could not be obtained. The surface of the film was chappy and the apparent coefficient of friction was lower because of the thermal decomposition.

EXAMPLE 2

In order to find the effects of variation of the amount of the rigid polymer and the method of addition, the pourability of mixture, the melt extrusion processability, the slippage of film and the gas barrier characteristics were measured.

The styrene-isobrolylene copolymer (PST-IB) having a softening temperature of 85° to 96° C. and a melt viscosity of 7 to 15 poise (at 170° C.) was added to vinylidene chloride monomer in the composition of (A) at various ratios to produce copolymer compositions (G) to (L).

In the productions, PST-IB was added by various methods (I) PST-IB was dissolved into vinylidene chloride monomer to uniformly mix and the solution and vinyl chloride were used to obtain the copolymer composition. (II) PST-IB was dry-blended to the copolymer composition (A). (III) PST-IB was dissolved into a mixed solvent of n-hexane and acetone (n-hexane: 90 wt.%) at a concentration of 20 wt.% and the solution was added to the copolymer composition (A) and the mixture was dried at 50° C. for 48 hours. (The amounts of PST-IB in the cases (I) – (III), are shown by weight part per 100 wt. parts of vinylidene chloride.

As the reference, DOA as the conventional plasticizer was added to the copolymer composition (A) at various ratios to obtain the copolymer compositions (M) — (O).

Table 2

| Copolymer composition | | Melt Extrusion | | Coefficient of friction (23° C) | | Permeability of oxygen cc/m² |
|---|---|---|---|---|---|---|
| | | Melt viscosity (poise) at 170° C. | Processability | SUS-film | Film-film | day atm. (30°C.) |
| Ref. (A) | Basic (A) | 22 × 10³ | Bad | 0.51 | 0.85 | 4.2 |
| Inv. (B) | (A) + PST-IB 2 parts | 7 × 10³ | Good | 0.49 | 0.69 | 4.2 |
| Ref. (C) | (A) + DOA 2 parts | 10 × 10³ | Fair | 0.74 | 2.00 | 20 |
| Ref. (D) | (A) + DOA 3 parts | 7 × 10³ | Good | 0.82 | 2.30 | 28 |
| Ref. (E) | (A) + DOA 3 parts + CaCO₃ 0.1 part + Amide 0.05 part | 7 × 10³ | Good | 0.60 | 0.68 | 28 |
| Inv. (F) | (B) + DOA 3 parts | 2 × 10³ | Good | 0.50 | 0.70 | 28 |

The copolymer composition comprising the styrene polymer in vinylidene chloride-vinyl chloride copolymer had lower melt viscosity and excellent processability and improved slippage of the surface of film in comparison with the copolymer composition comprising the same amount of DOA. The permeability of oxygen was the same with the copolymer comprising no additive to be high level.

When 3 wt. parts of DOA was added, the processability of the composition was the same with that of compo- In accordance with the process of Example 1, inflation films having a thickness of 25μ were obtained.

The pourability of mixture was tested by Japanese Industrial Standard — K-6722 using a bulk density tester to measure times for falling 170 g of the mixture at 25° C., 50° C. and 90° C.

The melt viscosity, the melt extrusion processability, the coefficient of friction of film and the permeation of oxygen were measured by the methods of Example 1. The results are shown in Table 3.

Table 3

| Addition | Composition | | Pourability (sec.) | | |
|---|---|---|---|---|---|
| | | | (25° C) | (50° C) | (90° C) |
| | (A) | basic comp. | 7.3 | 9.3 | 9.1 |
| | (G) | (A)+PST-IB 0.5 part | — | — | — |
| | (H) | (A)+PST-IB 1 part | 6.7 | 7.1 | 7.5 |
| Inv. I | (I) | (A)+PST-IB 2 part | — | — | — |
| | (J) | (A)+PST-IB 3 part | 6.5 | 6.8 | 7.0 |
| | (K) | (A)+PST-IB 5 part | 6.5 | 6.8 | 6.8 |
| | (I) | (A)+PST-IB 1 part | 8.0 | none | none |
| Ref. II | (J) | (A)+PST-IB 3 part | 11.2 | none | none |
| | (K) | (A)+PST-IB 5 part | none | none | none |
| | (G) | (A)+PST-IB 1 part | 7.4 | 9.1 | 9.4 |
| Ref. III | (J) | (A)+PST-IB 3 part | 8.3 | 8.5 | 8.5 |
| | (K) | (A)+PST-IB 5 part | 7.6 | 8.0 | 8.2 |
| | (L) | (A)+PST-IB 7 part | — | — | — |
| | (M) | (A)+DOA 0.5 part | 8.7 | 9.3 | 9.2 |
| Ref. II | (N) | (A)+DOA 3 part | 6.9 | 8.0 | 8.0 |
| | (O) | (A)+DOA 5 part | 7.2 | 8.4 | 8.1 |

Table 3'

| Addition | Composition | Melt viscosity poise (170° C) | Processability | Coefficient of friction SUS-film (23° C) | Permeability of oxygen cc/m² day atm. (30° C) |
|---|---|---|---|---|---|
| | (A) | 22 × 10³ | Bad | 0.51 | 4.2 |
| | (G) | 12 × 10³ | Fair | 0.50 | 4.2 |
| I | (H) | 10 × 10³ | Good | 0.49 | 4.2 |
| | (I) | 7 × 10³ | Good | 0.49 | 4.2 |
| | (J) | 5 × 10³ | Good | 0.47 | 4.0 |
| | (K) | 3 × 10³ | Good | 0.45 | 4.0 |
| | (I) | 7.5 × 10³ | Bad | impossible extrusion clogging hopper | |
| II | (J) | 4 × 10³ | Bad | " | |
| | (K) | 1 × 10³ | Bad | " | |
| | (G) | 11 × 10³ | Good | 0.47 | 4.2 |
| | (J) | 4 × 10³ | Good | 0.45 | 4.2 |
| III | (K) | 2 × 10³ | Bad | Foam in tube impossible film formation | |
| | (L) | — | Bad | Phase separation impossible film formation | |
| | (M) | 13 × 10³ | Fair | 0.65 | 6.8 |
| II | (N) | 8 × 10³ | Good | 0.82 | 28 |
| | (O) | 5 × 10³ | Good | 0.85 | 88 |

From the results shown in Table 3, the following facts are found.

In the tests of the methods of addition of the styrene polymer, the pourability was deteriorated in the dry-blend, and the complete separation of the solvent was difficult in the addition as the solvent solution, and the pourability and the melt extrusion processability were excellent in the addition by dissolving it in vinylidene chloride monomer.

The copolymer compositions produced by adding PST-IB dissolved in vinylidene chloride monomer were different from the copolymer compositions comprising DOA as the conventional plasticizer. The melt viscosity can be lower depending upon increasing the amount of the styrene polymer, but the permeability of oxygen was the same with that of non-addition to be high and the slippage of the surface of film was remarkably improved by the addition.

When the amount of PST-IB was more than 5 wt. parts, the phase-separation was remarkable to be difficult to form the film.

EXAMPLE 3

In order to find the effects of the kinds of the rigid polymers to the melt extrusion processability, the slippage, the gas barrier characteristics, 2 wt. parts of each of various rigid polymers was uniformly dissolved into 100 wt. parts of vinylidene chloride monomer in the copolymer composition (A) of Example 1, and the copolymerization was carried out in accordance with the process for producing the copolymer composition (B) to obtain the copolymer compositions (P)-(W).

As the reference, 2 wt. parts of each of two kinds of the known modifier was added to 100 wt. parts vinylidene chloride monomer, and the copolymerization was carried out to obtain the copolymer compositions (X)-(Y).

In accordance with the process of Example 1, inflation films having a thickness of 25μ were obtained.

The coefficient of friction, the permeability of oxygen and the melt ivscosity of the films were measured by the method of Example 1. The results are shown in Table 4.

From the results shown in Table 4, it was found that the slippage was improved and the remarkably lower gas barrier characteristic was given by the additions of the rigid polymers in comparison with the addition of the conventional modifiers. The differences of the effects depending upon the kinds of the rigid polymers were not so remarkable.

Table 4

|  |  |  | Coefficient of friction SUS-film (23° C) | Permeability of oxygen melt viscosity (30° C) dayatm. | Melt viscosity poise (170° C) | Processability | Melt viscosity of rigid polymer poise (170° C) |
|---|---|---|---|---|---|---|---|
|  | (A) | Basic (A) | 0.51 | 4.2 | $22 \times 10^3$ | Bad | — |
| Invention | (P) | (A)+PST | 0.50 | 4.2 | $13 \times 10^3$ | Fair | 200 |
|  | (Q) | (A)+PST-AN(ST75%) | 0.62 | 4.2 | $10 \times 10^3$ | Good | 30 |
|  | (R) | (A)+PST-MA(ST95%) | 0.60 | 4.2 | $13 \times 10^3$ | Fair | 100 |
|  | (S) | (A)+PST-MMA (ST70%) | 0.58 | 4.6 | $11 \times 10^3$ | Good | 50 |
|  | (T) | (A)+P$\alpha$-MT | 0.60 | 4.0 | $8 \times 10^3$ | Good | 2 |
|  | (U) | (A)+PDCP | 0.55 | 4.2 | $8 \times 10^3$ | Good | 0.2 |
|  | (V) | (A)+petrosin | 0.60 | 4.5 | $10 \times 10^3$ | Good | 20 |
|  | (W) | (A)+terpene resin | 0.60 | 4.5 | $9 \times 10^3$ | Good | 0.1 |
| Ref. | (X) | (A)+DOA | 0.74 | 20 | $10 \times 10^3$ | Good | 0.1* |
|  | (Y) | (A)+epoxidized linseed oil | 0.67 | 13 | $12 \times 10^3$ | Fair | 0.1** |

ST:styrene
AN:acrylonitrile
MA:methyl acrylate
α-MT:α-methyl toluene
DCP:dicyclopentadiene
P:polymer or copolymer
*:viscosity of DOA
**:viscosity of epoxidized linseed oil.

What is claimed is:

1. A vinylidene chloride copolymer composition which comprises 0.01 to 5 wt. parts of a rigid polymer solidified as fine particles in 100 wt. parts of a matrix of vinylidene chloride copolymer wherein said rigid polymer is solid at room temperature, has a softening temperature of 50° to 180° C. and a melt viscosity of 0.1 to 500 poise at 170° C. and is soluble in vinylidene chloride monomer and is substantially immiscible with the vinylidene chloride copolymer; and wherein said copolymer composition is prepared by polymerizing 60 to 90 wt.% of vinylidene chloride and 40 to 5 wt.% of a comonomer in the presence of said rigid polymer.

2. A vinylidene chloride copolymer composition according to claim 1 wherein a plasticizer, a stabilizer, or an elastomer is added to the monomer mixture before the copolymerization.

3. A vinylidene chloride copolymer composition according to claim 1 wherein the rigid polymer is a styrene polymer, a methyl methacrylate-styrene copolymer, a vinyl chloride polymer, an acrylonitrile polymer, an acrylonitrile copolymer, a rigid polyester, a polyamide, an oligomer thereof, a hydrogenated or modified petroleum resin, a terpene resin or an alkyd resin which has a softening temperature of 50° to 180° C. and a melt viscosity of 0.1 to 500 poise at 170° C. and is soluble in vinylidene chloride monomer and is not substantially miscible to the vinylidene chloride copolymer.

4. The composition of claim 1, wherein said comonomer is selected from the group consisting of vinyl chloride, acrylonitrile, acrylic acid, $C_1$-$C_{18}$ alkyl acrylates, methacrylic acid, $C_1$-$C_{18}$ alkyl methacrylates, maleic anhydride, maleic acid, vinyl acetate, ethylene, propylene, isobutylene and butadiene.

5. The composition of claim 1 wherein said rigid polymer has a softening point of 80°–160° C.

6. The composition of claim 3 wherein said rigid copolymer includes copolymers containing at least one comonomer selected from the group consisting of isobutylene, butadiene, vinyl acetate, ethylene oxide, vinyl methylether, vinylisobutyl ether, acrylic acid, acrylic acid esters, methacrylic acid, methacrylic acid esters, maleic anhydride, maleic acid, and maleic acid esters.

7. The composition of claim 2 wherein said plasticizers and stabilizers are selected from the group consisting of dioctyl adipate, dioctyl sebacate, dibutyl sebacate, tributyl citrate, tricetylcitrate, glycerol esters, epoxidized vegetable oil, epoxystearic acid octyl ester, and isopropylidene diphenol-epichlorohydrine condensate.

8. The composition of claim 2 wherein said elastomer is selected from the group consisting of ethylene-vinyl acetate copolymer, ethyleneacrylic acid copolymer, and polymers and copolymers of styrene, butadiene alkyl acrylate or alkyl methacrylate.

9. The composition of claim 2 wherein the amount of said elastomer is 1–20% by weight.

* * * * *